United States Patent
Hoshino et al.

(10) Patent No.: US 6,954,056 B2
(45) Date of Patent: Oct. 11, 2005

(54) SWITCHING POWER SUPPLY UNIT AND CONTROLLER IC THEREOF

(75) Inventors: Taichi Hoshino, Kyoto (JP); Eitaro Oyama, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 11 days.

(21) Appl. No.: 10/712,159

(22) Filed: Nov. 12, 2003

(65) Prior Publication Data

US 2004/0113600 A1 Jun. 17, 2004

(30) Foreign Application Priority Data

Nov. 14, 2002 (JP) ...................................... 2002-331092

(51) Int. Cl.$^7$ ................................................. G05F 1/40
(52) U.S. Cl. ........................ 323/285; 323/288; 323/901
(58) Field of Search ................................. 323/238, 246, 323/282, 284, 285, 288, 901, 908; 363/49

(56) References Cited

U.S. PATENT DOCUMENTS 6,512,353 B2 * 1/2003 Sanzo et al. ................. 323/284
6,624,619 B2 * 9/2003 Fujita et al. ................. 323/288

FOREIGN PATENT DOCUMENTS

| JP | 8-186980 | 7/1986 |
| JP | 1-295665 | 11/1989 |
| JP | 11-75365 | 3/1999 |
| JP | 2001-251849 | 9/2001 |

* cited by examiner

Primary Examiner—Jessica Han
(74) Attorney, Agent, or Firm—Merchant & Gould P.C.

(57) ABSTRACT

A low-voltage operating block and a high-voltage operating block are controlled at the same soft start voltage as that employed at the time of start-up. At a point in time at which an output DC voltage has reached an expected value, a control signal of the low-voltage operating block is switched to a control signal of the high-voltage operating block. As a result, switching is smoothly performed without involvement of occurrence of a variation in the output voltage before and after switching operation. In a switching power supply unit having a low-voltage operating block and a high-voltage operating block, which are intended for producing a higher DC voltage from a low power supply voltage, it prevents occurrence of a rush current and a start-up failure, which would otherwise be caused by switching operation.

5 Claims, 4 Drawing Sheets

SWITCHING POWER SUPPLY UNIT AND CONTROLLER IC THEREOF

BACKGROUND OF THE INVENTION

1. Field of the Invention

The invention relates to a switching power supply unit which switches input voltage to produce output voltage that is different from the input voltage, and to a controller IC thereof.

2. Description of the Related Art

In a portable cellular phone, a digital camera, a PDA, and a personal computer, a higher DC voltage is often required to be produced from a low power supply voltage such as a battery cell. In such a case, the higher DC voltage might be produced from a switching power supply unit, however, in many cases, it might be difficult for an actual apparatus to perform all the control operations, including a PWM control operation, at a low power supply voltage. For this reason, a conventional switching power supply unit is provided with a low-voltage operating block capable of operating at a low voltage within the range from 1.0 to 1.5 volts or thereabouts such as disclosed in JP-A-8-186980. In said reference, disclosed is the circuit configuration such that at start up timing, a battery voltage is first boosted up to a voltage at which another regular operating block for performing PWM control or the like can be operated, by means of the low-voltage operating block. Subsequently, to the operation is shifted to the regular PWM control operation.

Figure 3:
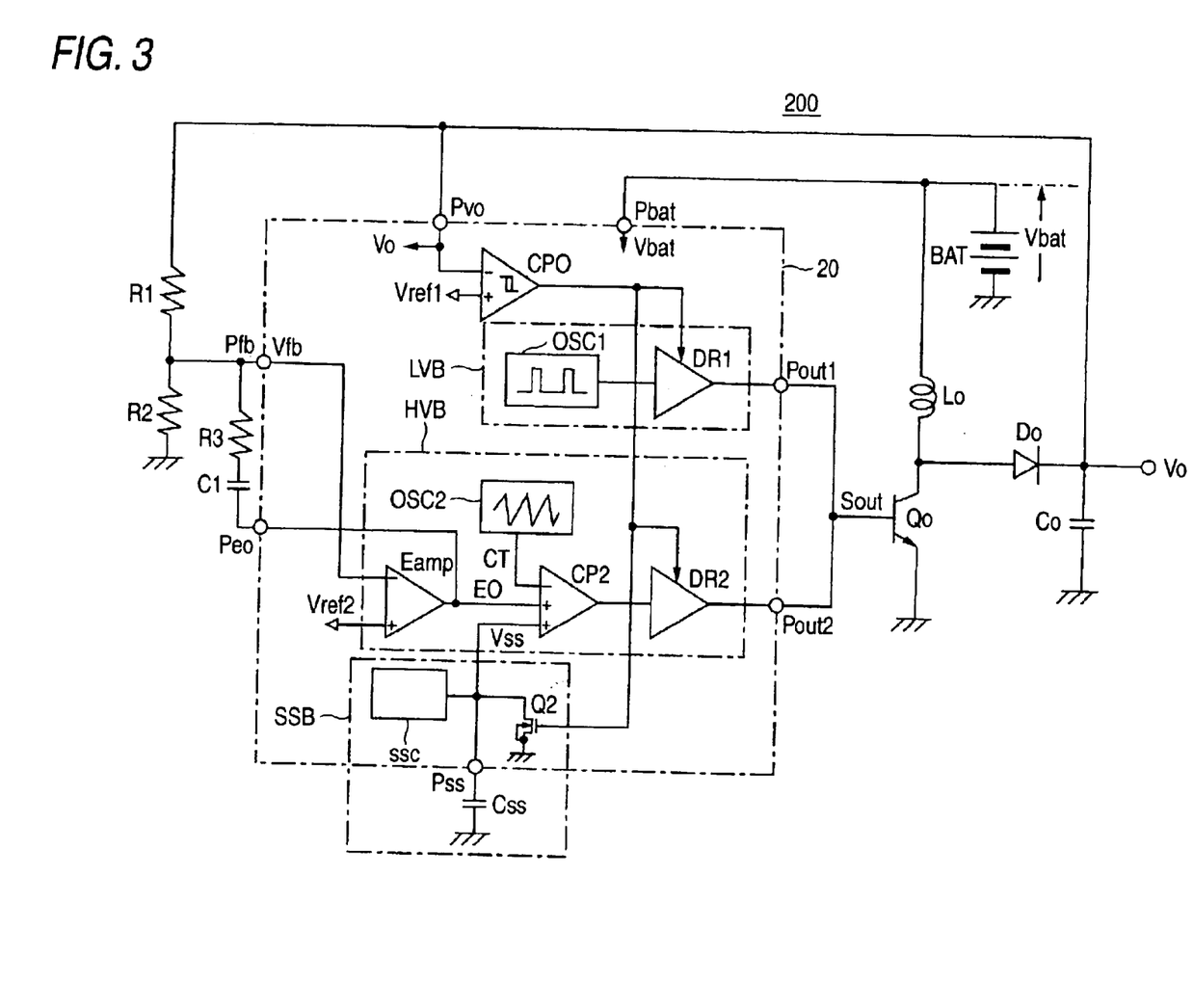
FIG. 3 is a view showing the configuration of a related-art switching power supply unit.
Figure 4:
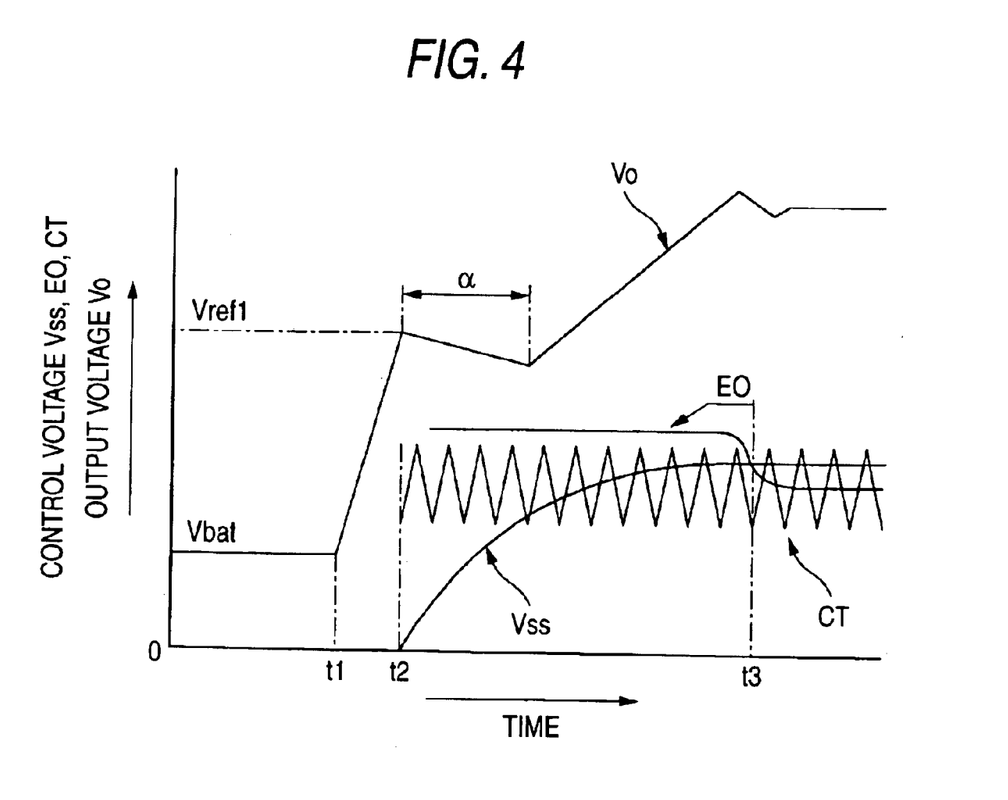
FIG. 4 is a view schematically showing a characteristic achieved at the time of start-up operation of the switching power supply unit shown in FIG. 3.

FIG. 3 is a view showing the configuration of a switching power supply unit 200 in which such a conventional switching power supply unit has been partially modified in accordance with actual use, thereby producing a higher DC voltage from a low power supply voltage. FIG. 4 is a view schematically showing a characteristic of the start-up of the switching power supply unit 200 shown in FIG. 3.

In FIG. 3, a battery BAT, such as the one including two nickel hydrogen battery cells, is serving as a DC power supply use, whose battery voltage Vbat of the battery is about 1.5 volts. The voltage Vbat is connected to the earth by way of an inductor Lo and a switching transistor Qo serving as an NPN transistor. The switching transistor Qo is switched between on and off in response to a switching control signal Sout. A collector voltage of the switching transistor Qo is rectified and smoothed by a rectifier diode Do and a smoothing capacitor Co, whereby an output voltage Vo is output (e.g., 5.0 volts is output at the time of a stationary state).

The switching control signal Sout provided to the switching transistor Qo is produced and output by a controller IC 20. A commonly-used voltage control method is to feed back the output voltage Vo, compare the output voltage Vo with a reference voltage to produce an error signal which is compared with a triangular wave signal so as to produce a pulse width modulation (PWM) signal, and perform a switching-control to the switching transistor Qo according to the pulse width modulation signal.

However, an actual apparatus often encounters difficulty in performing all control operations such as PWM control operation at a low voltage on the order of 1.5 volts or thereabouts. Therefore, the switching power supply unit shown in FIG. 3 has a low-voltage operating block LVB which is capable of operating at a low voltage (e.g., 1.5 volts). At start-up, the low-voltage operating block LVB boosts the battery voltage Vbat to a voltage (e.g., 2.5 volts) at which another ordinary high-voltage operating block HVB for performing PWM control or the like can operate. Subsequently, this system shifts operation to an ordinary PWM control operation.

The configuration of the controller IC 20 will be further described. The battery voltage Vbat is input to a battery voltage terminal Pbat of the controller IC 20, which is provided to individual circuits operated at a low voltage. Further, the output voltage Vo is input directly to an output voltage terminal Pvo of the controller IC 20. The output voltage Vo serves as a comparison input for a comparator CP0, and also fed to the individual circuits which require a high voltage. Further, the feedback voltage Vfb obtained by the output voltage Vo being divided by potential-divider resistors R1, R2 is input to a feedback voltage terminal Pfb.

The high-voltage operating block HVB that operates under normal conditions has an error amplifier Eamp which outputs an error output signal E0 between the feedback voltage Vfb and a second reference voltage Vref2 which is fed back from an error output terminal Peo to the feedback voltage terminal Pfb by way of a feedback capacitor C1 and a resistor R3; a triangular wave signal oscillator OSC2; a PWM comparator CP2 which receives a triangular wave signal CT output from the oscillator OSC2, an error output signal EO, and a soft start voltage (hereinafter, "SS voltage") Vss serving as a dead time control (DTC) voltage; and a second driver DR2 which amplifies an output of the PWM comparator CP2 which is output as the control signal Sout from a second control signal output terminal Pout2.

The PWM comparator CP2 compares the triangular wave signal CT with the error output signal EO or the SS voltage Vss, whichever signal is smaller. The second driver DR2 operates when an operating command signal (low level voltage in this case) is given to. The high-voltage operating block HVB cannot be operated sufficiently when the output voltage Vo is equal to or slightly higher than the battery voltage Vbat. Consequently, the second reference voltage Vref2 or the SS voltage Vss, whichever signal is smaller, serves as a reference voltage for controlling the high-voltage operating block HVB.

The low-voltage operating block LVB, operating at the start-up timing, has an oscillator OSC1 which starts oscillating upon receipt of the supplied battery voltage Vbat, to thus produce a rectangular wave pulse; and a first driver DR1 which amplifies a pulse produced by the oscillator OSC1 to be output as the control signal Sout from a first control signal output terminal Pout1. The first driver DR1 operates when an operating command signal (high level voltage in this case) is given to. The low-voltage operating block LVB operates sufficiently at the battery voltage Fbat regardless of the output voltage Vo.

The comparator CP0 compares the output voltage Vo with the first reference voltage Vref1, thereby produces a high-level or low-level output as a comparison result. The first reference voltage Vref1 is set to a voltage at which individual circuits of the high-voltage operating block HVB can operate sufficiently. Consequently, when the output voltage Vo has surpassed the first reference voltage Vref1, the second driver DR2 starts operating, and the first driver DR1 halts. The comparator CP0 owns a hysteresis characteristic in order to stabilize comparison operation.

The soft start block SSB has a soft start circuit SSC, a soft start capacitor Css and a soft start activation switch Q2. The soft start circuit SSC is connected in series to the external capacitor Css by way of a soft start terminal Pss. A node between the soft start terminal Pss and the external capacitor Css is connected to the earth by way of the soft start activation switch Q2 serving as an NMOS transistor. The soft start circuit SSC produces an SS voltage serving as a DTC voltage. Hence, in order to produce an SS voltage which is to serve as the DTC voltage, the soft start circuit SSC is formed from a resistance-type potential divider circuit which divides the power supply voltage by resistance and outputs the thus-divided voltage. A high-level or low-level output from the comparator CP0 is applied to a gate of the activation switch Q2.

Operation of the switching power supply unit 200 having such a configuration; particularly, operation of the switching power supply unit 200 performed at start-up, will be described further by reference to FIG. 4.

When the oscillator OSC1 has started oscillating operation at point in time t1, the switching power supply unit 200 starts operation. Immediately after the oscillator OSC1 has started operation, the output voltage Vo corresponds to the battery voltage Vbat, which is lower than the first reference voltage Vref1 (Vo<Vref1). Hence, an output from the comparator CP0 is at high level. Therefore, the second driver DR2 remains inoperative; the activation switch Q2 remains at on-state; and the first driver DR1 remains in an operating state. Individual circuits of the low-voltage operating block LVB also operate at the battery voltage Vbat, which is a low voltage. Hence, the oscillator OSC1 outputs a rectangular wave pulse having a predetermined frequency. The rectangular wave pulse is amplified by the first driver DR1, whereby the amplified pulse is output as a control signal Sout by way of the control signal output terminal Pout1 to control the on-off states of the switching transistor Qo.

As a result of on-off control of the switching transistor Qo, the output voltage Vo gradually increases in the manner shown in FIG. 4, by means of charging and discharging energy into and from the inductor Lo.

At a point in time t2 at which the output voltage Vo has increased and surpassed the first reference voltage Vref1, the output from the comparator CP0 is inverted to a low level. As a result, the first driver DR1 shifts from an operating state to an inoperative state, whereas the second driver DR2 shifts from the inoperative state to the operating state. Further, the activation switch Q2 is turned off to start recharging the capacitor Css. Thus, soft start operation for PWM control is started.

The output voltage Vo achieved at the point in time t2 corresponds to the first reference voltage Vref1 at which individual circuits of the high-voltage operating block HVB can operate sufficiently. However, the soft start operation is commenced at the point in time t2. Hence, the control signal Sout is not output until the SS voltage Vss attains a level at which the voltage can be compared with the triangular wave signal CT. Consequently, the capacitor Co is not recharged with any more electric charge whereby the output voltage Vo cannot increase. This period is indicated by α in the drawing. Subsequently, as the SS voltage Vss increases, PWM control is performed by taking the SS voltage Vss as a reference voltage, whereupon the output voltage Vo increases.

At the point in time t1 and subsequent points, the feedback voltage Vfb is lower than the second reference voltage Vref2, whereby the error output signal EO remains at a high level continuously. The PWM comparator CP2 compares the triangular wave signal CT with the error output signal EO or the SS voltage Vss, whichever signal is lower. When the feedback voltage Vfb approaches the second reference voltage Vref2 as a result of an increase in the output voltage Vo, the error output signal EO decreases. At a point in time t3 at which the error output signal EO becomes equal to the ever-increasing SS voltage Vss, the control reference used for PWM control shifts from the SS voltage Vss to the error output signal EO. As a result, normal feedback control is performed, and the output voltage Vo is subjected to PWM control such that the feedback voltage Vfb becomes equal to the second reference voltage Vref2.

In the conventional switching power supply unit, when operation of the low-voltage operating block LVB is switched to operation of the high-voltage operating block HVB at time t2 shown in FIG. 4, there arise a period during which an oscillating operation stops and a period during which only a pulse width narrower than a required pulse width is obtained. Therefore, although it depends on its load conditions, a start-up failure might arise under such a condition that the output voltage Vo is supplied to a load during the period α shown in FIG. 4 and subsequent periods during which a PWM pulse width is narrow, whereby the charge in the capacitor Co are supplied to the load, and consequently, the output voltage Vo decreases.

If, as a result of a decrease in the output voltage Vo, the output voltage Vo has becomes lower than the first reference voltage Vref1 in excess of the hysteresis width of the comparator CP0, the output of the comparator CP0 again attains a high level, thereby turning on the activation switch Q2. As a result, the capacitor Css that is being charged might be discharged. The switching operation and the soft start operation are again started after the output voltage Vo has been fully recovered by operation of the low-voltage operating block LVB. When these operations are repeated, an start-up failure might arise.

In order to avoid occurrence of such a situation, if soft start for PWM control is omitted, a large rush current might flow when it is switched from the control operation by the low-voltage operating block LVB to the control operation by the high-voltage operating block HVB. This might bring about adverse effect to the battery power supply or cause an inconvenience of a large drop in the battery voltage Vbat.

The control operation by the low-voltage operating block LVB is ON/OFF control without a feedback due to the rectangular pulse of the oscillator OSC1. Hence, there arises a problem that a rush current flows at the time of start-up.

There may also arise a problem that ringing in the output voltage Vo occurs around at the timing of t3 when the control reference voltage to be compared with the triangular wave signal CT shifts from the SS voltage Vss to the error output signal EO.

SUMMARY OF THE INVENTION

The object of the invention is to provide a switching power supply unit having a low-voltage operating block and a high-voltage operating block to produce a higher DC voltage from a low power supply voltage, and a controller IC thereof, which prevents occurrence of a rush current and a start-up failure at switching.

Another object of the invention is to shorten overall start-up time by smooth switching control operation.

The invention provides a switching power supply unit having a switching power supply section for converting an input voltage Vbat into a higher output voltage Vo by switching in accordance with a switching control signal Sout, and to output the higher output voltage Vo; a soft start section SSB-A for producing a soft start voltage Vss which gradually increases at start-up; a voltage comparing comparison section CP0 for comparing the output voltage Vo with a first reference voltage Vref1; a low-voltage circuit section LVB-A, which compares the soft start voltage Vss with a feedback voltage Vfb obtained by feeding back the output voltage Vo, for producing a pulse signal when the soft start voltage Vss is high; and a high-voltage circuit section HVB-A, which compares either a second reference voltage Vref2 or the soft start voltage Vss with the feedback voltage Vfb according to a relationship of a level of the second reference voltage Vref2 and a level of the soft start voltage Vss to produce an error signal EO, for producing a PWM control signal based on a comparison result of the error signal EO with a triangular wave signal CT, wherein when the output voltage Vo is lower than the first reference voltage Vref1, the pulse signal is output as the switching control signal Sout, and when the output voltage Vo is higher than the first reference voltage Vref1, the PWM control signal is output as the switching control signal Sout.

Furthermore, the low-voltage circuit section LVB-A involves a comparator CP1 for producing a comparison output when the soft start voltage Vss is higher than the feedback voltage Vfb; a pulse generator OSC1 for producing a pulse signal according to the comparison output from the comparator CP1; and a first driver DR1, which is driven by the comparison output from the voltage comparing section CP0, for outputting the pulse signal as the switching control signal Sout, and the high-voltage circuit section HVB-A involves an error amplifier Eamp, which has either the second reference voltage Verf2 or the soft start voltage Vss with the feedback voltage Vfb according to a relationship of level of the second reference voltage Vref2 and a level of the soft start voltage Vss to produce the error signal EO, for feeding back the error signal EO to the feedback voltage by way of a feedback element; a triangular wave signal oscillator OSC2 for producing the triangular wave signal CT; a PWM comparator CP2 for producing the PWM control signal based on a comparison the error signal EO with the triangular wave signal CT; and a second driver DR2, which is driven by the comparison output from the voltage comparing section CP0, for outputting the PWM control signal as the switching control signal Sout.

The invention provides a controller IC for controlling a switching power supply section for converting an input voltage Vbat into a higher output voltage Vo by switching in accordance with a switching control signal Sout, to output the higher output voltage Vo, having a soft start circuit SSC, which cooperates with a capacitor Css, for producing a soft start voltage Vss which gradually increases at start-up; a voltage comparing section CP0 for comparing the output voltage Vo with a first reference voltage Vref1; a low-voltage circuit section LVB-A, which compares the soft start voltage Vss with a feedback voltage Vfb obtained by feeding back the output voltage Vo, for producing a pulse signal when the soft start voltage Vss is high; and a high-voltage circuit section HVB-A, which compares either a second reference voltage Vref2 or the soft start voltage Vss with the feedback voltage Vfb according to a relationship of a level of the second reference voltage Vref2 and a level of the soft start voltage Vss to produce an error signal EO, for producing a PWM control signal based on a comparison result of the error signal EO with a triangular wave signal CT, wherein when the output voltage Vo is lower than the first reference voltage Vref1, the pulse signal is output as the switching control signal Sout, and when the output voltage Vo is higher than the first reference voltage Vref1, the PWM control signal is output as the switching control signal Sout.

Furthermore, the low-voltage circuit section LVB-A involves a comparator CP1 for producing a comparison output when the soft start voltage Vss is higher than the feedback voltage Vfb; a pulse generator OSC1 for producing a pulse signal according to the comparison output from the comparator CP1; and a first driver DR1, which is driven by the comparison output from the voltage comparing section CP0, outputting the pulse signal as the switching control signal Sout, and the high-voltage circuit section HVB-A involves an error amplifier Eamp, which compares either the second reference voltage Vref2 or the soft start voltage Vss with the feedback voltage Vfb according to a relationship of a level of the second reference voltage Vref2 and a level of the soft start voltage Vss to produce the error signal EO, for feeding back the error signal EO to the feedback voltage by way of a feedback element; a triangular wave signal oscillator OSC2 for producing the triangular wave signal CT; a PWM comparator CP2 for producing the PWM control signal based on a comparison result of the error signal EO with the triangular wave signal CT; and a second driver DR2, which is driven by the comparison output from the voltage comparing section CP0, for outputting the PWM control signal as the switching control signal Sout.

Moreover, the controller IC further has an external terminal Pss to which is connected the capacitor Css for producing the soft start voltage Vss in cooperation with the soft start circuit SSC.

DETAILED DESCRIPTION OF THE PREFERRED EMBODIMENTS

Figure 1:
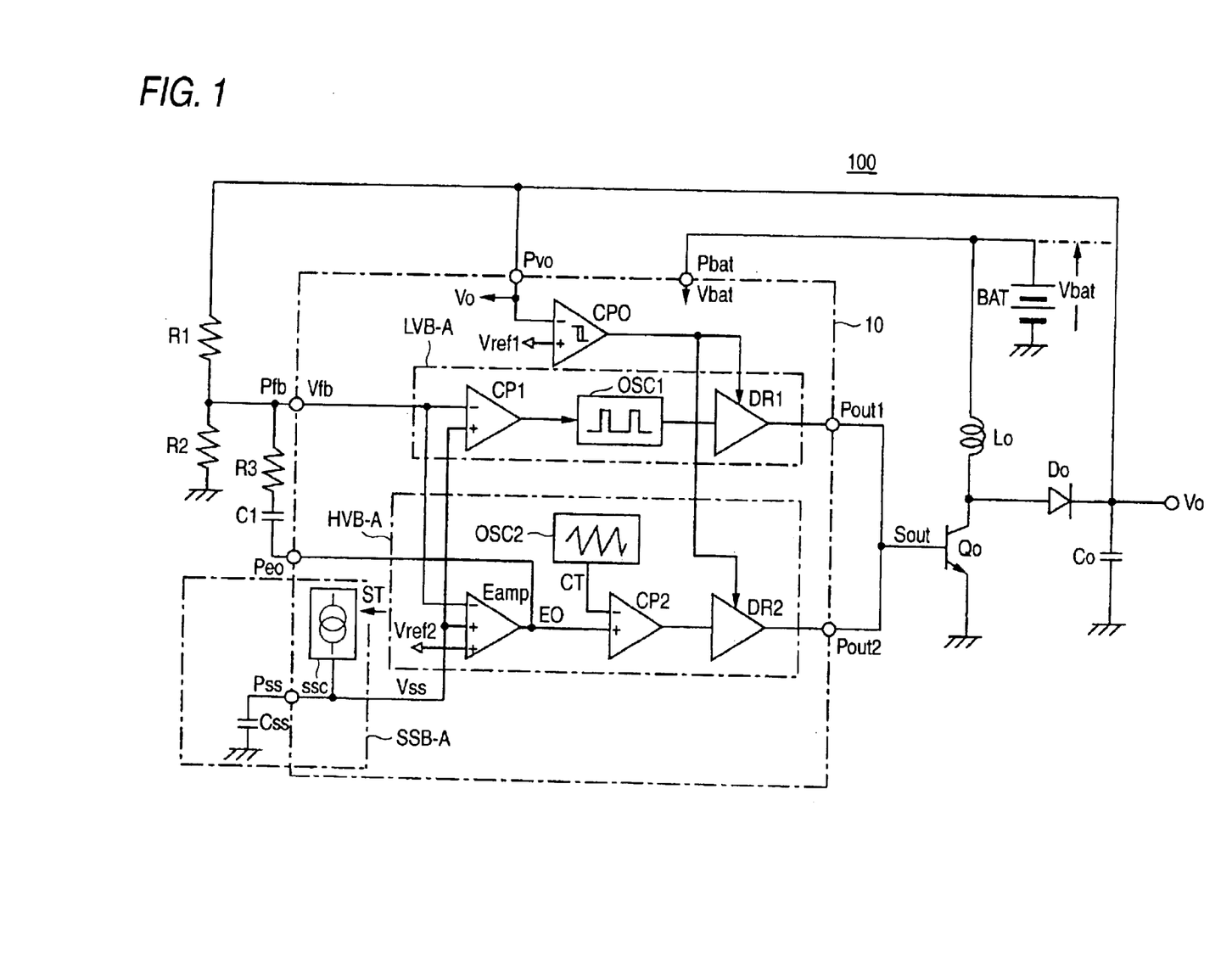
FIG. 1 is a view showing the configuration of a switching power supply unit according to an embodiment of the invention.
Figure 2:
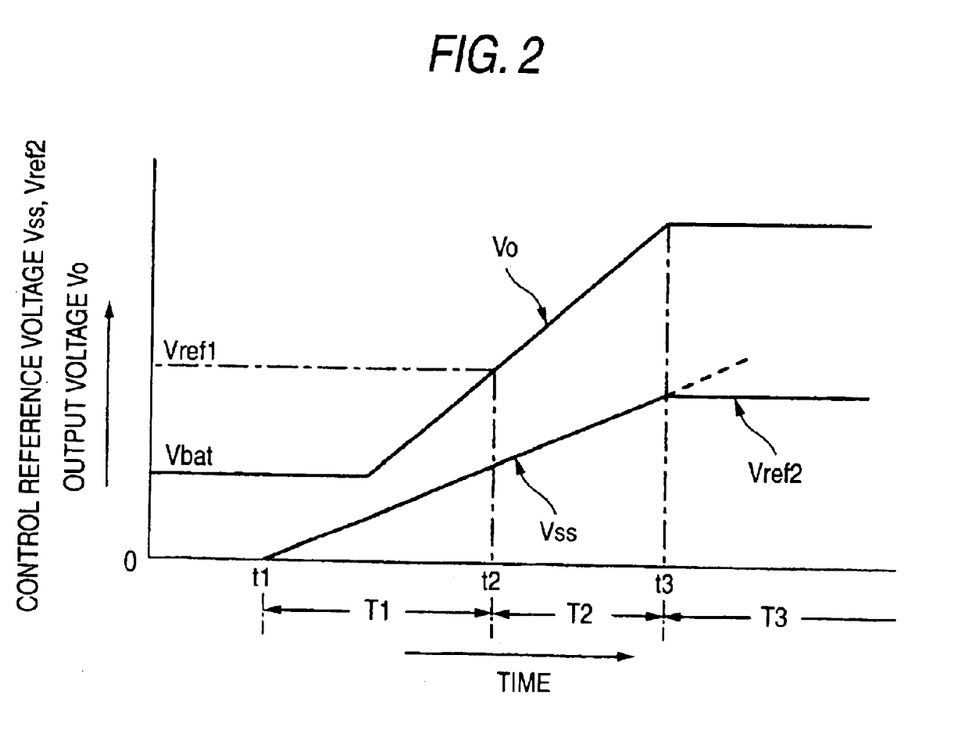
FIG. 2 is a view schematically showing a characteristic achieved at the time of start-up operation of the switching power supply unit shown in FIG. 1.

An embodiment of a switching power supply unit according to the invention and a controller IC thereof will be described hereinbelow by reference to the drawings. FIG. 1 is a view showing the configuration of a switching power supply unit according to a first embodiment of the invention. FIG. 2 is a view schematically showing a characteristic of the switching power supply unit at the time of start-up.

The switching power supply unit 100 shown in FIG. 1 differs from the conventional switching power supply unit 200 shown in FIG. 3 in terms of a low-voltage operating block LVB-A, a high-voltage operating block HVB-A, and a soft start block SSB-A, which are in a controller IC 10. Other parts of the switching power supply unit 100 are identical with each other of the conventional switching power supply unit 200. Therefore, explanations are primarily given of differences between the switching power supply unit 100 of the invention and the conventional related-art switching power supply unit 200. In order to avoid redundancy, explanations for same parts are omitted.

The soft start block SSB-A has a soft start circuit SSC and a capacitor Css. The soft start circuit SSC is connected in series to the external capacitor Css by way of a soft start terminal Pss. A voltage appearing at a node between the soft start circuit SSC and the external capacitor Css is an SS voltage Vss. The soft start circuit SSC is formed from, e.g., a constant current source circuit. The soft start circuit SSC starts operation when a start signal ST is applied. The SS voltage Vss is supplied to the low-voltage operating block LVB-A and the high-voltage operating block HVB-A.

The low-voltage operating block LVB-A has a voltage comparator CP1, an oscillator OSC1 and a first driver DR1. In the voltage comparator CP1, the SS voltage Vss is input to a non-inverted input terminal (+), and a feedback voltage Vfb is input to an inverted input terminal (−). The voltage comparator CP1 compares these two inputs with each other to produce a high-level output when the SS voltage Vss is higher than the feedback voltage Vfb, and the high-level output is applied to the oscillator OSC1.

The oscillator OSC1 performs oscillation while the oscillator OSC1 receives the high-level signal from the voltage comparator CP1. Conversely, the voltage comparator CP1 suspends oscillation while the voltage comparator CP1 receives a low-level signal. The rectangular wave pulse signal produced by oscillation of the oscillator OSC1 is supplied to the first driver DR1. In other words, according to the invention, the low-voltage operating block LVB-A performs a kind of pulse frequency modulation (PFM). The first driver DR1 is identical with that shown in FIG. 3.

The high-voltage operating block HVB-A has an error amplifier Eamp, a triangular signal oscillator OSC2, a PWM comparator CP2 and a second driver DR2. In the error amplifier Eamp, a second reference voltage Vref2 is input to a first non-inverted input terminal (+), and the feedback voltage Vfb is input to a inverted input terminal (−). In this regard, the error amplifier Eamp is identical with that of being shown in FIG. 3. According to the invention, the error amplifier Eamp further has a second non-inverted input terminal (+) to which the SS voltage Vss is input. An internal circuit of the error amplifier Eamp is configured such that the signal input to the first non-inverted input terminal or the signal input to the second non-inverted input terminal, whichever signal is smaller, is prioritized. Consequently, the SS voltage Vss or the second reference voltage Vref2, whichever voltage is lower, acts as a control reference voltage and is compared with the feedback voltage Vfb. An error output signal EO, which is a result of the comparison, is fed back to the feedback voltage Vfb by way of a resistor R3 and a capacitor C1 and is input to a non-inverted input terminal (+) of the PWM comparator CP2.

The triangular oscillator OSC2 is identical with that of being shown in FIG. 3, and a triangular wave signal CT oscillated in the triangular oscillator OSC2 is input to a inverted input terminal (−) of the PWM comparator CP2. The error output signal EO and the triangular wave signal CT are input to the PWM comparator CP2. The PWM comparator CP2 compares these two signals to produce high-level output only while the error output signal EO is higher than the triangular wave signal CT. That is, the PWM comparator CP2 outputs a PWM control signal whose pulse width is controlled according to the magnitude of the error output signal EO. The PWM control signal output from the PWM comparator CP2 is supplied to the second driver DR2. The second driver DR2 is identical with that shown in FIG. 3.

Operation of the switching power supply unit 100 having such a configuration, particularly operation at start-up of the switching power supply unit, will be described further by reference to FIG. 2.

As shown in FIG. 1, the battery voltage Vbat is supplied to the controller IC 10, which produces a state of the output voltage Vo being zero, so that the start signal ST is supplied to the soft start circuit SSC at the time t1. As a result, the switching power supply unit 100 starts up. When the start signal ST is supplied, a constant current flows from the constant current circuit of the soft start circuit SSC to the capacitor Css so as to enable the charged voltage of the capacitor Css or the SS voltage Vss to rise gradually.

The SS voltage Vss is supplied to both the voltage comparator CP1 and the error amplifier Eamp. The feedback voltage Vfb is also supplied to both the voltage comparator CP1 and the error amplifier Eamp. During start-up period, the SS voltage Vss is lower than the second reference voltage Vref2. Therefore, the SS voltage Vss is compared with the feedback voltage Vfb by means of the voltage comparator CP1 and the error amplifier Eamp.

In the high-voltage operating block HVB-A, even when the power supply voltage utilizing the output voltage Vo is low, the error amplifier Eamp, the oscillator OSC2 and the PWM comparator CP2 attempt to operate respectively. However, while the power supply voltage is low, operation reliability of these devices is low. Therefore, the PWM control signal output from the PWM comparator CP2 is blocked by the second driver DR2. As the operation reliability of these devices increases with an increase of the power supply voltage, the PWM control signal is utilized when the devices have become sufficiently reliable.

In the low-voltage operating block LVB-A, the first driver DR1 operates. The voltage comparator CP1 outputs a high-level voltage when the SS voltage Vss is higher than the feedback voltage Vfb. As a result, the oscillator OSC1 oscillates to produce a pulse signal. The pulse output is supplied to the switching transistor Qo as a switching control signal Sout by way of the first driver DR1 in operation. By means of on/off operation of the switching transistor Qo, the output voltage Vo increases gradually.

When the feedback voltage Vfb has become higher than the SS voltage Vss as a result of that the output voltage Vo increased, the voltage comparator CP1 outputs a low-level voltage, and the oscillator OSC1 stops oscillation. For this reason, the output voltage Vo increases with an increase of the SS voltage Vss.

During start-up period, the low-voltage operating block LVB-A is subjected to soft start control in accordance with the SS voltage Vss. Hence, the switching power supply unit can be started up smoothly without flow of a rush current.

Once the output voltage Vo has reached the first reference voltage Vref1 at the time t2, the output of the comparator CP0 is inverted, that is, the output of the comparator CP0 drops from a high level to a low level. As a result, the first driver DR1 becomes inoperative, and the second driver DR2 becomes operative. The first reference voltage Vref1 is set to a voltage at which operation of the high-voltage operating block HVB-A is sufficiently reliable.

The error amplifier Eamp, the triangular wave oscillator OSC2 and the PWM comparator CP2 operate according to the relation of the SS voltage Vss and the feedback voltage Vfb before the second driver DR2 has become operative, to thus produce the PWM control signal. At the time t2 when the second driver DR2 becomes operative, the reliability of the PWM control signal has become sufficiently high.

At the time t2, the control signal Sout is switched from the pulse signal of the low-voltage operating block LVB-A to the PWM control signal of the high-voltage operating block HVB-A.

Both the pulse signal of the low-voltage operating block LVB-A and the PWM control signal of the high-voltage operating block HVB-A are based on the SS voltage Vss and the feedback voltage Vfb. Hence, shock stemming from switching operation becomes very small. A shock might be determined by means of only a difference between the degree of accuracy of the control performed through on/off operation of oscillating operation and the degree of accuracy of the PWM control or a difference between the degrees of elaboration of the control operations. Consequently, the switching operation can be performed smoothly.

Even after the control has been switched to the PWM control at the time t2, the SS voltage Vss continues increasing, and the output voltage Vo increases correspondingly.

The soft start control operation is completed when the SS voltage Vss has reached the second reference voltage Vref2 at time t3. At the time t3, a voltage for comparing with the error amplifier Eamp shifts from the SS voltage Vss to the second reference voltage Vref2. From the time t3 onward, the PWM control is performed so that the feedback voltage Vfb becomes equal to the second reference voltage Vref2. When the reference voltage for comparison shifts from the SS voltage Vss to the second reference voltage Vref2, ringing such as the conventional does not occur to the output voltage Vo.

As mentioned above, during the period T1 from the starting time t1 to the switching time t2, the PFM control is performed by the low-voltage operating block LVB-A. During a period T2 from the switching time t2 to the time t3 (the time when the soft start control operation completes), the PWM control operation on the basis of the SS voltage Vss is performed by the high-voltage operating block HVB-A. During an ordinary operation period T3 after the time t3, the PWM control operation on the basis of the second reference voltage Vref2 is performed by the high-voltage operating block HVB-A.

According to the invention, the switching power supply unit can smoothly start operation by means of the PFM control performed by the low-voltage operating block LVB-A even at the starting time t1. Even at the switching time t2, switching can be made smoothly from the PFM control operation performed by the low-voltage operating block LVB-A to the PWM control operation performed by the high-voltage operating block HVB-A. As the control operation is smoothly switched at the time t2, a required time (T1+T2) for start-up operation can be more shortened than the conventional.

The voltage comparator CP1 and the oscillator OSC1 as well as the first driver DR1, that is, the entire low-voltage operating block LVB-A, may be made inoperative by means of an output from the comparator CP0. In this case, there can be diminished the power dissipated by the low-voltage operating block LVB-A which is not used during an ordinary operation performed after start-up.

The capacitor Css may be not outside but inside the controller IC10. In this case, the soft start terminal Pss may be omitted.

The resistors R1, R2, R3 and the capacitor C1 may be provided not outside but inside the controller IC10. In this case, the feedback voltage terminal Pfb and the error output terminal Peo can be omitted by utilization of the output voltage terminal Pvo.

According to the embodiment, the switching power supply unit 100 has the low-voltage operating block LVB-A and the high-voltage operating block HVB-A as control sections for the purpose of producing a higher DC voltage from a low power supply voltage and a controller IC thereof, the low-voltage operating block LVB-A and the high-voltage operating block HVB-A are controlled on the basis of the same soft start voltage at start-up. At the time an output DC voltage has reached an expected value, it is switched from a control signal of the low-voltage operating block LVB-A to a control signal of the high-voltage operating block HVB-A. Basically, a variation does not arise in the output voltage between before and after switching operation. Hence, switching is performed smoothly.

The high-voltage operating block HVB-A effectively performs control immediately after the control performed by the low-voltage operating block LVB-A has been switched to the control performed by the high-voltage operating block HVB-A. Hence, the risk of occurrence of a start-up failure, which would otherwise could be caused by the conventional switching power supply unit, can be eliminated.

When the control performed by the low-voltage operating block LVB-A is switched to the control performed by the high-voltage operating block LVB-A, there is no time at which voltage control is halted, which would otherwise arise in the conventional. Hence, the required time to boost a voltage to a predetermined DC voltage can be shortened.

What is claimed is:

1. A switching power supply unit comprising:
a switching power supply section for converting an input voltage into a higher output voltage by switching in accordance with a switching control signal, to output the higher output voltage;
a soft start section for producing a soft start voltage which gradually increases at start-up;
a voltage comparing section for comparing the output voltage with a first reference voltage;
a low-voltage circuit section, which compares the soft start voltage with a feedback voltage obtained by feeding back the output voltage, for producing a pulse signal when the soft start voltage is high; and
a high-voltage circuit section, which compares either a second reference voltage or the soft start voltage with the feedback voltage according to a relationship of a level of the second reference voltage and a level of the soft start voltage to produce an error signal, for producing a PWM control signal based on a comparison result of the error signal with a triangular wave signal,
wherein when the output voltage is lower than the first reference voltage, the pulse signal is output as the switching control signal, and
when the output voltage is higher than the first reference voltage, the PWM control signal is output as the switching control signal.

2. The switching power supply unit according to claim 1, wherein the low-voltage circuit section involves:
a comparator for producing a comparison output when the soft start voltage is higher than the feedback voltage;
a pulse generator for producing a pulse signal according to the comparison output from the comparator; and
a first driver, which is driven by the comparison output from the voltage comparing section, for outputting the pulse signal as the switching control signal, and
the high-voltage circuit section involves:
an error amplifier, which compares either the second reference voltage or the soft start voltage with the feedback voltage according to a relationship of a level of the second reference voltage and a level of the soft start voltage to produce the error signal, for feeding back the error signal to the feedback voltage by way of a feedback element;

a triangular wave signal oscillator for producing the triangular wave signal;

a PWM comparator for producing the PWM control signal based on a comparison result of the error signal with the triangular wave signal; and a second driver, which is driven by the comparison output from the voltage comparing section, for outputting the PWM control signal as the switching control signal.

3. A controller IC for controlling a switching power supply section for converting an input voltage into a higher output voltage by switching in accordance with a switching control signal, to output the higher output voltage, comprising:

a soft start circuit, which cooperates with a capacitor, for producing a soft start voltage which gradually increases at start-up;

a voltage comparing section for comparing the output voltage with a first reference voltage;

a low-voltage circuit section, which compares the soft start voltage with a feedback voltage obtained by feeding back the output voltage, for producing a pulse signal when the soft start voltage is high; and a high-voltage circuit section, which compares either a second reference voltage or the soft start voltage with the feedback voltage according to a relationship of a level of the second reference voltage and a level of the soft start voltage to produce an error signal, for producing a PWM control signal based on a comparison result of the error signal with a triangular wave signal, wherein when the output voltage is lower than the first reference voltage, the pulse signal is output as the switching control signal, and when the output voltage is higher than the first reference voltage, the PWM control signal is output as the switching control signal.

4. The controller IC according to claim 3, wherein the low-voltage circuit section involves:

a comparator for producing a comparison output when the soft start voltage is higher than the feedback voltage;

a pulse generator for producing a pulse signal according to the comparison output from the comparator; and a first driver, which is driven by the comparison output from the voltage comparing section, for outputting the pulse signal as the switching control signal, and the high-voltage circuit section involves:

an error amplifier, which compares either the second reference voltage or the soft start voltage with the feedback voltage according to a relationship of a level of the second reference voltage and a level of the soft start voltage to produce the error signal, for feeding back the error signal to the feedback voltage by way of a feedback element;

a triangular wave signal oscillator for producing the triangular wave signal;

a PWM comparator for producing the PWM control signal based on a comparison result of the error signal with the triangular wave signal; and a second driver, which is driven by the comparison output from the voltage comparing section, for outputting the PWM control signal as the switching control signal.

5. The controller IC according to claim 3, further comprising:

an external terminal to which is connected the capacitor for producing the soft start voltage in cooperation with the soft start circuit.

* * * * *